(No Model.)
A. SCHMIDT.
PLOW.
No. 537,075. Patented Apr. 9, 1895.
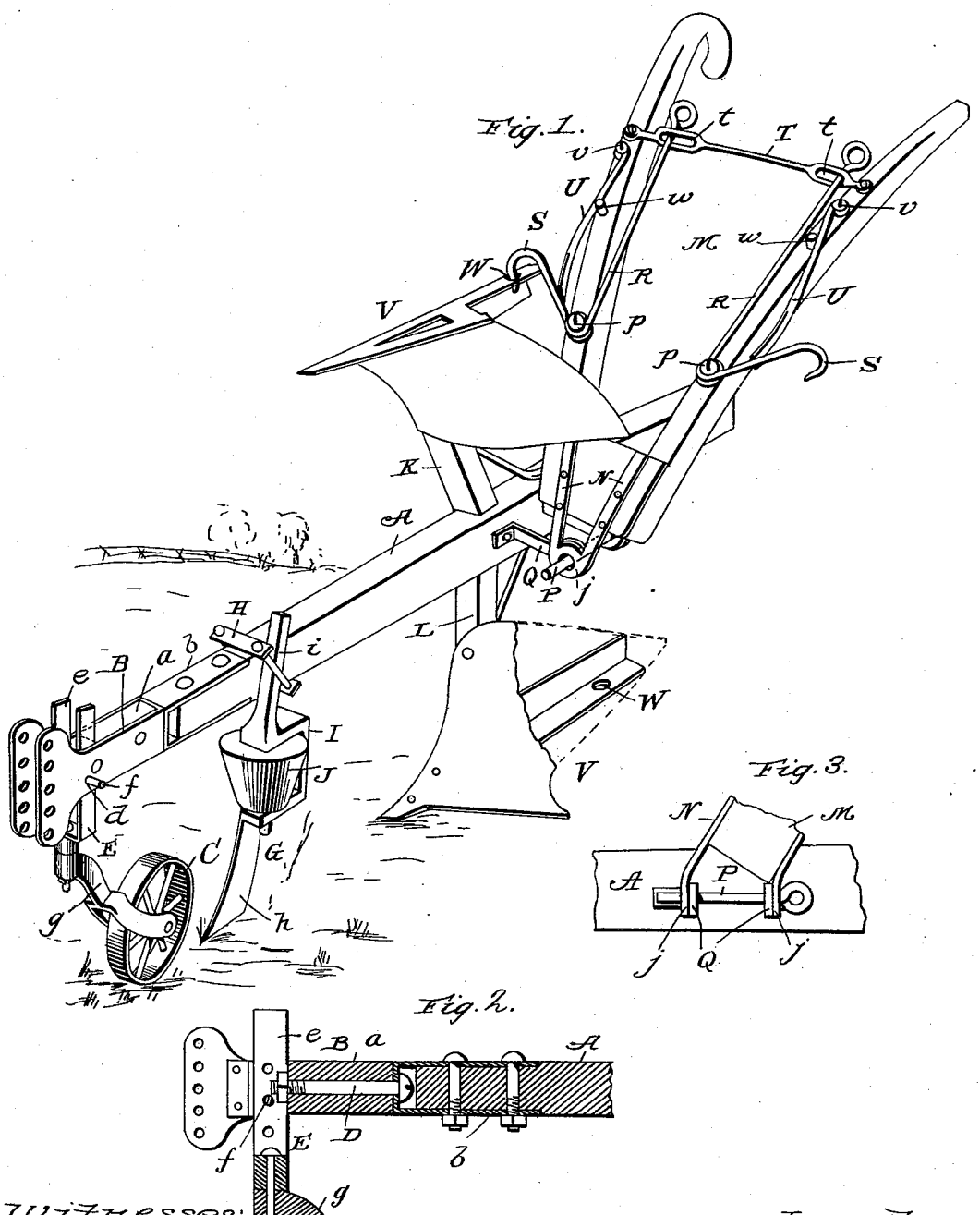
Witnesses:
Inventor
A. Schmidt
By James J. Shuhy
Attorney

UNITED STATES PATENT OFFICE.

ALOIS SCHMIDT, OF RICHFIELD, MINNESOTA.

PLOW.

SPECIFICATION forming part of Letters Patent No. 537,075, dated April 9, 1895.

Application filed July 16, 1894. Serial No. 517,729. (No model.)

*To all whom it may concern:*

Be it known that I, ALOIS SCHMIDT, a citizen of the United States, residing at Richfield, in the county of Hennepin and State of Minnesota, have invented certain new and useful Improvements in Plows; and I do declare the following to be a full, clear, and exact description of the invention, such as will enable others skilled in the art to which it appertains to make and use the same.

This invention has relation to an improvement in reversible plows, and the novelty and many advantages of the invention will appear from the following description and claims, when taken in connection with the annexed drawings, in which—

Figure 1 is a perspective view of my improved plow with parts broken away. Fig. 2 is a longitudinal sectional view through the clevis and a part of the beam, with the gage wheel shaft partly broken away. Fig. 3 is a detail view of the hinge or pivotal joint between the plow beam and handles.

Referring by letter to said drawings:—A, indicates the plow beam which may be mainly of the ordinary construction. This plow beam is provided at its forward end with a swivel jointed clevis B, and carries a gage wheel C. The clevis which may be mainly of any ordinary or approved construction is designed to turn or partly turn upon the outer end of the plow beam and may be connected thereto in any well known manner. In the present illustration, I have shown the clevis as composed of a forked or looped strap or casting, having a block $a$, arranged within it and provided with an aperture for the passage of a bolt or rod D. This bolt or rod which may be headed at one end and threaded at its opposite end passes through an aperture in a strap $b$ on the forward end of the beam and through the aperture in the block $a$, and is provided on its free end with a nut. The parallel arms of the clevis are provided with transverse apertures $d$, and said arms are designed to receive between them the vertical branches $e$, of a yoke or frame E. The branches of this yoke are provided with a plurality of apertures to receive a pin $f$, which also takes through the apertures in the branches of the clevis so that said yoke may be connected adjustably with the clevis. In this yoke, the arm $g$, of the gage wheel is swiveled or otherwise suitably connected so that said gage wheel will be adjusted in adjusting the yoke or frame.

G, indicates the colter. This colter is of a peculiar construction having the cutting blade $h$, at its lower end and the shank $i$, at its upper end for attachment to the beam; the attachment being made by the usual connecting device H, as shown, and may comprise threaded bolts, securing plates, and nuts. At a suitable point in the length of the colter is an angular portion I, which extends rearwardly, and within this angular portion is journaled vertically a conical or tapering roller J, the smaller or reduced end being lowermost. By the provision of this roller it will be seen that as weeds and other trash have been cut by the blade H, and they naturally rise when brought into contact with the roller, they will be cast down and into the furrow.

The plow beam is provided at a suitable point in its length with two standards K, and L. These standards are arranged opposite to each other and may be in the same transverse plane although it is preferable to have them arranged a little oblique with respect to each other, and one slightly in advance of the other. Each standard is suitably braced in position and carries a plow blade as shown, so that they may be used right and left. By arranging the mold boards as shown it will be seen that by simply reversing the plow by turning the beam at the swivel connection, the said plows may be used right and left as may be desired. When the beam is turned as just stated, the colter G, will point upwardly, and it is therefore necessary to reverse it so as to enable it to perform its usual functions.

M, indicates the handles. These handles may be of any ordinary or approved construction, and are hinged at their forward ends to the plow beam. I have shown the handles as having a block or plates connecting the converging ends and at these ends I provide metallic straps N, having eyes $j$, to receive the pintle or hinge rod P, which takes through similar eyes on the lugs Q, secured to the beam. By this construction it will be seen that the handles are free to swing laterally upon the beam and the beam is free to turn at its connection with the clevis.

R, indicates levers, there being one arranged on each handle. These levers which are of an angular form are pivoted at their angles by means of bolts $p$, or the like, and their lower ends are formed into hooks S, which are arranged oblique or approximately so with the main body. These hooked levers which extend up within convenient reach of the operator, are guided in slots $t$, in a transverse rod or bar T, and the hooks are kept normally outward by means of springs U. These springs may be secured at one end to the handle by a screw $v$, or the like and the opposite ends contact with the hooks $s$, there being preferably a stop $w$, employed for the spring and arranged upon the handle, although it is obvious that any suitable means might be used for keeping these hooks in an operative position. The plows are each adapted to be engaged by these hooks or catches, and I have shown the shoes V, of each plow provided with an aperture W, at or near its heel so that when raised out of use, it will be in a convenient position to receive the hooks or catches. By this construction it will be seen that when it is desired to use the left hand plow, for instance, the catch or hook of that plow is disconnnected and the catch or hook on the opposite handle brought to engage the right hand plow; the beam being turned at the clevis connection when the right hand plow will be held up in a fixed position with respect to the handle and out of use.

By the construction of catches or hooks and the employment of springs backing them, it will be seen that to disconnect the parts it is simply necessary to push the lever inwardly while the parts will engage by simply bringing them together.

Having described my invention, what I claim is—

1. A reversible plow comprising the beam, the plows mounted on standards extending in opposite directions from the beam and having apertures W, the handles pivotally connected with the beam so as to permit the same to turn, the angular levers, R, pivotally connected to or fulcrumed upon the handles at the apex of their angles and having hooks S, at their lower ends adapted to take into the apertures of the plows W, and springs connected to the handles and exerting a pressure against the levers R, substantially as and for the purpose set forth.

2. A reversible plow comprising the beam, the plows mounted on standards extending in opposite directions from the beam and having apertures W, the handles M, fixedly connected together and loosely connected with the beam at their lower ends so as to permit the same to turn, the cross bar T, fixedly connected to the handles and having the slots $t$, adjacent to its ends, the angular levers R, pivotally connected to or fulcrumed upon the handles at the apex of their angles and having hooks S, at their lower ends adapted to take into the apertures W, of the plows, and also having their upper portions arranged in the slots $t$, of the bar T, and springs connected to the handles and exerting a pressure against the levers R, substantially as and for the purpose specified.

3. In a plow, the combination of a beam, having the looped strap $b$, at its forward end, the clevis B, composed of a looped strap or casing having a block $a$, arranged within it, a gage wheel carried by the clevis, and the bolt or rod D, extending through an aperture in the strap $b$, on the beam and through the clevis and the block $a$, and thereby serving to pivotally connect the clevis to the beam, substantially as and for the purpose set forth.

In testimony whereof I affix my signature in presence of two witnesses.

ALOIS SCHMIDT.

Witnesses.
  H. M. PARKER.
  DAVID T. OWENS.